United States Patent [19]

Arhab

[11] Patent Number: 5,829,561
[45] Date of Patent: Nov. 3, 1998

[54] HYDROKINETIC COUPLING DEVICE

[75] Inventor: Rabah Arhab, St Brice sous Forêt, France

[73] Assignee: Valeo, Paris, France

[21] Appl. No.: 714,862

[22] Filed: Sep. 17, 1996

[30] Foreign Application Priority Data

Sep. 19, 1995 [FR] France ................................. 95 10959

[51] Int. Cl.$^6$ .................................................. F16H 45/02
[52] U.S. Cl. ........................................... 192/3.28; 192/212
[58] Field of Search ................................. 192/3.29, 3.28, 192/212

[56] References Cited

U.S. PATENT DOCUMENTS

| 4,274,519 | 6/1981 | Moroto et al. ......................... 192/3.28 |
| 4,722,715 | 2/1988 | Billet et al.l ......................... 192/212 X |
| 5,224,576 | 7/1993 | Fujimoto ............................... 192/3.28 |
| 5,590,750 | 1/1997 | Graton et al. .......................... 192/3.29 |

FOREIGN PATENT DOCUMENTS

| 3938724 | 5/1991 | Germany . |
| 2081401 | 2/1982 | United Kingdom . |
| 94-07058 | 3/1994 | WIPO . |

Primary Examiner—Thomas R. Hannon
Attorney, Agent, or Firm—Longacre & White

[57] ABSTRACT

The hydrokinetic coupling device has a locking clutch comprising a torsion damper, the web of which is at least partially fixed at its outer periphery to a shell of the turbine wheel by folded lugs engaged in slots formed in a part of the said web matching the surface of the said shell, this web is fixed mechanically at its inner periphery to one of the elements consisting of shell and plate carrying the said shell, the coupling device having a pre-assembled subassembly comprising the turbine wheel, the web, the guide washer and the circumferentially acting springs.

6 Claims, 1 Drawing Sheet

HYDROKINETIC COUPLING DEVICE

FIELD OF THE INVENTION

The invention relates to a hydrokinetic coupling device of the type having a rotating housing forming internally a bladed wheel suitable for hydrokinetically driving a turbine blade wheel housed in this housing and also having a locking clutch provided with a torsion damper, and more particularly an improvement to the connection between the torsion damper and the turbine blade wheel.

BACKGROUND OF THE INVENTION

A known hydrokinetic coupling device includes a housing comprising, cylindrical about an axis, on the one hand a casing provided with a transverse wall suitable for being connected with respect to rotation to a drive shaft and, on the other hand, a bladed wheel or impeller, suitable for hydrokinetically driving a turbine blade wheel, fixed to a hub suitable for being connected with respect to rotation to a driven shaft. The housing contains a locking clutch, usually referred to as a lock-up clutch, which acts between the driven element (the turbine wheel) and the driving element (the casing of the housing). This clutch comprises a torsion damper, a piston mounted so as to be able to move axially with respect to the driven element and at least one friction lining associated with the piston and suitable for being gripped between the said piston and the internal face of the said transverse wall of the housing. The turbine wheel inside the housing is driven by the so-called impeller wheel, by virtue of the coupling created by a fluid circulating in the housing and, after start up of the vehicle, the locking clutch acts to prevent any slip phenomena between the two wheels, by fixing together the driven shaft and the drive shaft with respect to rotation.

The torsion damper comprises circumferentially acting springs interposed between two parts, annular overall, made of pressed sheet metal. One of the parts, traditionally referred to as a guide washer, is fixed to the friction lining with respect to rotation whilst the other part, traditionally referred to as the web, is fixed to the turbine blade wheel connected to the driven shaft with respect to rotation. In the document WO-A-94/07058, or its U.S. equivalent U.S. Pat. No. 5,590,750 a description is given notably of such a hydrokinetic coupling device comprising a torsion damper in which the said web is welded to the turbine wheel. However, the weld is particular tricky to carry out in this context since the parts to be welded have to undergo heat treatment.

On such parts, if it is desired to effect a weld, it is necessary to protect the parts to be welded during the heat treatment.

DISCUSSION OF THE INVENTION

One of the aims of the invention is to ensure fixing of the said web and the said turbine wheel simply and effectively, without welding.

Another aim of the invention is to allow the production of a subassembly comprising the turbine wheel and the torsion damper, permitting easy assembly of the main constituents of the hydrokinetic coupling device.

More particularly, the invention therefore concerns a hydrokinetic coupling device comprising a housing and a turbine wheel mounted rotatably in this housing and also including a locking clutch provided with a torsion damper comprising a guide washer, a web and springs mounted circumferentially between them, the said web being fixed to the said turbine wheel and the latter consisting of an annular shell carried by an annular plate and provided internally with blades fixed to the said shell by lugs engaged in corresponding slots therein, folded outwards, characterised in that the said web is at least partly fixed at its outer periphery to the said shell by such folded lugs, engaged in corresponding slots formed in a part of the said web matching the external surface of the said shell, in that the said web is fixed mechanically at its inner periphery to one of the elements comprising the shell and annular plate carrying the said shell and in that it includes a pre-assembled subassembly comprising essentially the turbine wheel, the web fixed thereto as indicated above, the guide washer and the circumferentially acting springs. The guide washer is coupled to the web with circumferential clearance corresponding to the range of action of the springs; it includes for this purpose lugs directed radially towards the inside, engaged in circumferential slots in the said web. With such an arrangement, a friction disc is interposed between the internal wall of the housing and a piston able to move axially therein, actuated by the oil pressure at the time of lock-up. The friction disc is coupled with respect to rotation to the guide washer and for this purpose has axially oriented lugs cooperating with notches in this guide washer.

BRIEF DISCUSSION OF THE DESCRIPTION

The invention will be better understood and other advantages thereof will emerge more clearly from the description which follows of a hydrokinetic coupling device according to its principle, given solely by way of example and with reference to the accompanying drawings in which:

FIG. 1 is a half-section of a hydrokinetic coupling device according to the invention; and FIG. 2 view similar to FIG. 1 illustrating a variant.

DESCRIPTION OF THE PREFERRED EMBODIMENT

Figure 1:
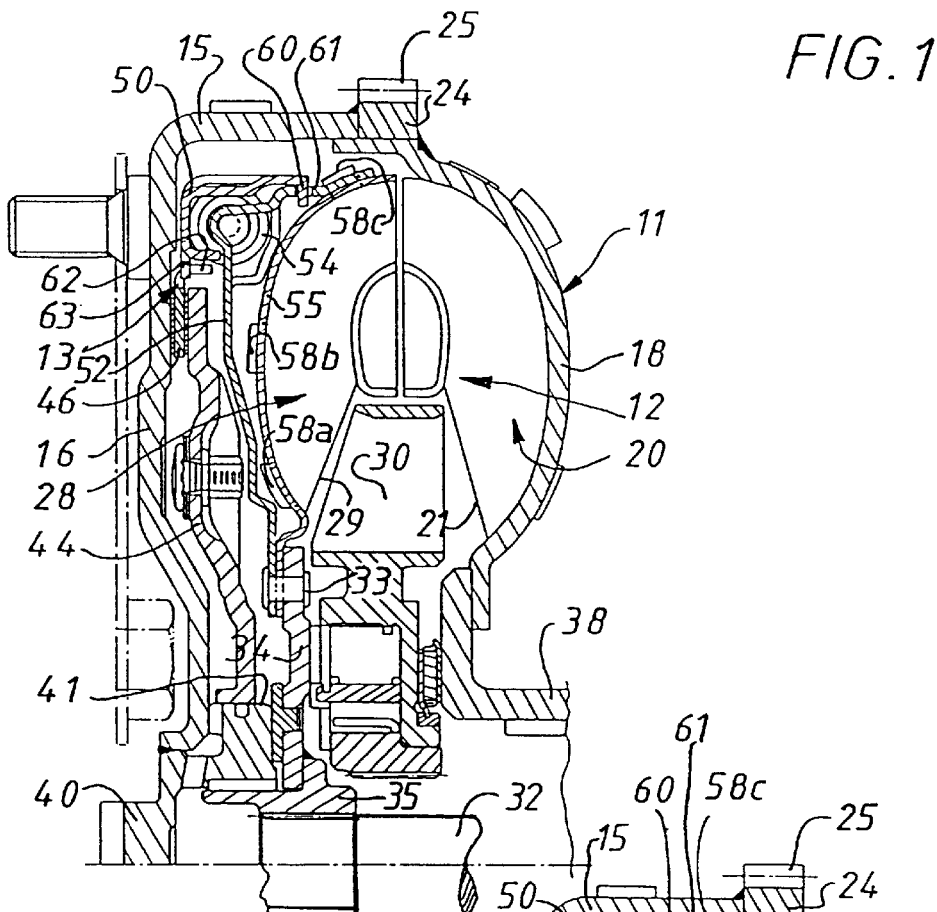

The hydrokinetic coupling device depicted has, arranged in the same fluidtight housing forming an oil casing 11, a torque converter 12 and a locking clutch 13. The casing 11 forms a driving element and is suitable for being connected with respect to rotation to the crankshaft of the internal combustion engine of a motor vehicle. This casing, which is annular, is composed of a first shell 15 having an annular transverse wall 16 and a second shell 18 facing the first and shaped so as to define an impeller wheel 20, with blades 21. The blades of this wheel are fixed to the internal face of the second shell 18. The shells 15, 18 are connected, here by welding to one and the same annular part 24 constituting a starter ring designed to be driven by the vehicle starter. For this purpose, the annular part 24 has teeth 25 at its outer periphery. The torque converter also comprises a turbine wheel 28 provided with blades 29 facing the blades 21 of the impeller 20 and a reactor wheel 30. The turbine wheel 28 is connected with respect to rotation to a driven shaft 32 whilst being fixed at its inner periphery by rivets 33 to an annular plate 34 itself welded to a hub 35 coupled by teeth to the driven shaft 32. The shell 18 has a sleeve 38 slidably mounted on a fixed shaft (not shown). A hub 40 is welded centrally to the first shell 15; it has a cylindrical surface forming a sliding bearing 41 for a piston 44 actuating the locking clutch 13. The latter has a friction disc 46 suitable for being gripped between the inner face of the annular transverse wall 16 and a plane surface of the said piston 44 when the latter is forced, under the effect of the oil pressure, towards the said annular transverse wall 16. The friction disc 46 is coupled with respect to rotation to an annular part made of pressed sheet metal, hereinafter referred to as the guide washer 50. The disc 46 has a metal support clad on each of its faces with friction linings suitable for being gripped as aforementioned between the wall 16 and the piston 14. Moreover, another annular part of the torsion damper, hereinafter referred to as the web 52, is fixed to the turbine wheel. The guide washer 50 and the web 52 are shaped so as to constitute circumferential stops against which bear the corresponding ends of helical springs 54 mounted circumferentially between the web 52 and the guide washer 50. The guide washer 50 is coupled to the web 52 with circumferential clearance enabling the springs 54 to fulfil the role of torsion damper and to absorb the torque peaks.

In a manner known per se, the turbine wheel 28 has an annular shell 55 and the blades 29 are fixed to the said shell by lugs 58 engaged in corresponding slots therein, the lugs being folded towards the outside of the shell. In the example depicted, each blade 29 has three lugs 58a, 58b, 58c, situated at different radial distances. The shell 55 is carried by the annular plate 34.

According to one important characteristic of the invention, the said web 52 is at least partly fixed to the shell 55 by some of the folded lugs on the blades engaged in corresponding slots formed in a part of the web which matches the external surface of the shell.

Thus, in the example in FIG. 1, the web 52 is fixed at its external periphery by means of the lugs 58c which are radially the outermost on the said blades 29 whilst it is fixed by riveting in the vicinity of its inner periphery to the annular plate 34, carrying the said annular shell 55. In this example, the web 52 and the shell 55 are fixed to the said annular plate by the same set of rivets 60.

Figure 2:
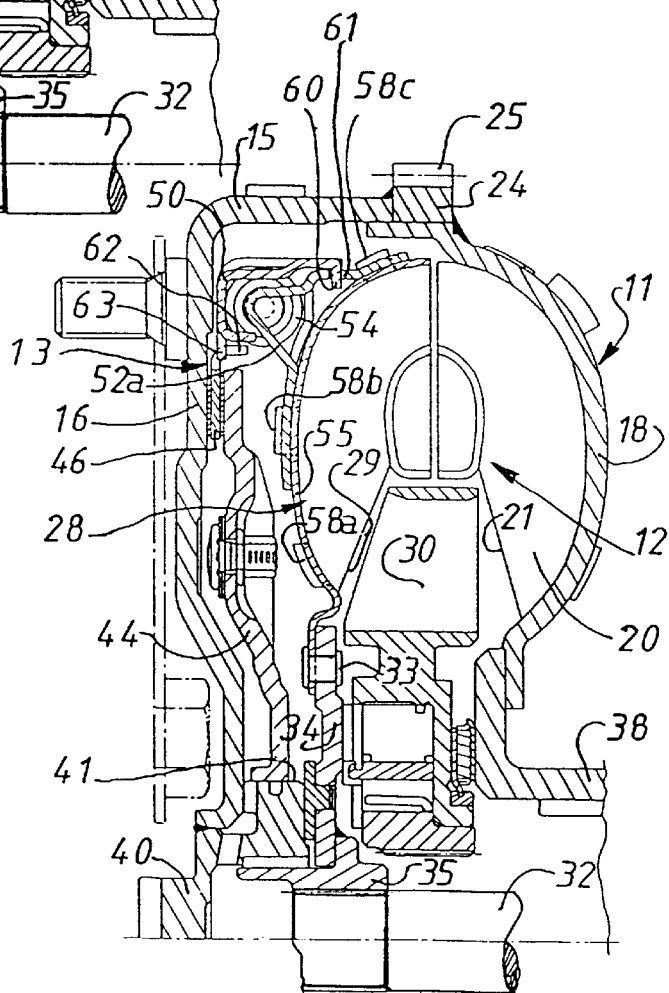

On the other hand, in the embodiment in FIG. 2, in which the components of similar structure bear the same numerical references and will not be described again, the web 52a is fixed to the said shell 55 by two rows of lugs 58b, 58c on the said blades, one row extending in the vicinity of its inner periphery and the other extending, as before, in the vicinity of its outer periphery.

The invention avoids having to weld the said web 52, 52a to the shell 55 of the turbine wheel. The web 52 can therefore be treated so as to be hardened at its circumferential stops (twisted in shape) for the springs 54.

In addition, this mounting is favourable to the production of a pre-assembled subassembly comprising essentially the turbine wheel 28, the web 52, 52a, the guide washer 50 and the circumferentially acting springs 54.

For this purpose, the said guide washer 50 is coupled to the web with circumferential clearance allowing the action of the springs and to this end it has lugs 60 directed radially inwards, engaged in circumferential slots 61 in the said web. Moreover, the friction disc 46 which is interposed between the annular transverse wall 16 of the housing and the axially mobile piston 44, is coupled with respect to rotation to the said guide washer 50 and has for this purpose axially oriented lugs 62 cooperating with notches 63 in the said guide washer. It is the support of the disc 46 which has such lugs 63 at its outer periphery, the notches being produced at the inner periphery of the guide washer 50.

The functioning is similar to that of a conventional hydrokinetic coupling device. For the record, it will be stated that the turbine wheel 28 is driven by the wheel of the impeller by virtue of the fluid (oil) contained in the box and that, after start-up of the vehicle, the locking clutch 13 affords, in order to prevent any phenomena of slip between the wheels, a connection of the driven shaft to the drive shaft, by gripping of the friction disc 46, under the effect of the axial movement of the piston 44. The locking which results therefrom allows direct driving of the driven shaft 32 (typically the input shaft of a gearbox), by the housing 11 connected to the crankshaft with respect to rotation.

Here, the lugs 60 and slots 61 are offset circumferentially with respect to the circumferential stops offered by the guide washer 50 and web 52. It is therefore for reasons of simplicity that the lugs 60 and slots 61 have been hatched in FIGS. 1 and 2.

It will be appreciated that, in FIG. 2, the web 52a is simplified since it is not fixed to the plate 34. The stops on the web 52a here have overall the shape of a V and are very strong.

For more information on the guide washer 50, reference should be made to the aforementioned document WO-A-94/07058, notably FIG. 39, in the knowledge that it includes support clefts and support lugs for the springs 54.

In all cases the guide washer 50 and springs 54 are located radially above the piston 44 and at the outer periphery of the turbine wheel 28.

The web 52 is fixed at its outer periphery by the folded lugs on the blades 29. At its inner periphery it is fixed mechanically, here by riveting or by the lugs 58c, to one of the elements consisting of plate 34 and shell 55, and this radially below the springs 54. In this way a strong fixing of the web 52 is obtained, favourable to the formation of a pre-assembled subassembly including as aforementioned the guide washer 50, springs 54 and web 52.

This subassembly is thus strong and robust and the web 54 less subject to deformation.

Naturally the guide washer 50 can have at its inner periphery axial lugs directed towards the turbine wheel 28 and with holes for forming mortices allowing the engagement of tenons formed by radial lugs projecting from the outer periphery of the disc 46.

What is claimed is:

1. A hydrokinetic coupling device comprising a housing and a turbine wheel mounted rotatably in said housing and also including a locking clutch provided with a torsion damper comprising a guide washer, a web and springs mounted circumferentially between them, the web being fixed to the turbine wheel and the turbine wheel consisting of an annular shell carried by an annular plate and provided internally with blades fixed to the shell by lugs engaged in corresponding slots therein, folded outwards, wherein the web is at least partly fixed at its outer periphery to the shell by such folded lugs, engaged in corresponding slots formed in a part of the web matching the external surface of the shell, wherein the web is fixed mechanically at its inner periphery to one of the elements comprising the shell and annular plate and wherein said device includes a pre-assembled subassembly comprising essentially the turbine wheel, the web, the guide washer and the circumferentially acting springs.

2. The hydrokinetic coupling device of claim 1, wherein the said web is fixed by riveting in the vicinity of its inner periphery to the annular plate, carrying the said annular shell.

3. The hydrokinetic coupling device of claim 2, wherein said web and the said shell are fixed to the said annular support by the same set of rivets.

4. The hydrokinetic coupling device of claim 1, wherein the said web is fixed to the said shell by two circular rows of lugs on the said blades, one extending in the vicinity of its inner periphery and the other in the vicinity of its outer periphery.

5. The hydrokinetic coupling device of claim 1, wherein the said guide washer is coupled to the said web with circumferential clearance and for this purpose has lugs directed radially inwards, engaged in circumferential slots in the said web.

6. The hydrokinetic coupling device of claim 5, wherein a friction disc is interposed between the internal wall of the said housing and a piston able to move axially therein, and in that this friction disc is coupled to the said guide washer with respect to rotation and for this purpose has axially oriented lugs cooperating with notches in the said guide washer.

* * * * *